United States Patent [19]

Van Houtte

[11] 4,097,073
[45] Jun. 27, 1978

[54] TAPPING SLEEVE FOR LARGE SIZE PIPE

[75] Inventor: Richard George Van Houtte, Bradford, Pa.

[73] Assignee: Dresser Industries, Inc., Dallas, Tex.

[21] Appl. No.: 725,207

[22] Filed: Sep. 22, 1976

[51] Int. Cl.² .......................................... F16L 41/00
[52] U.S. Cl. ................................... 285/197; 285/110
[58] Field of Search ............... 285/197, 373, 419, 110

[56] References Cited

U.S. PATENT DOCUMENTS

| | | | |
|---|---|---|---|
| 2,332,350 | 10/1943 | Scritchfield | 285/197 X |
| 2,790,652 | 4/1957 | Risley et al. | 285/197 X |
| 3,527,483 | 9/1970 | Dashner | 285/197 |
| 3,635,503 | 1/1972 | Rafalski | 285/197 |
| 3,807,435 | 4/1974 | Fenster et al. | 285/197 X |
| 3,840,255 | 10/1974 | Daghe | 285/110 X |

FOREIGN PATENT DOCUMENTS 1,368,752  10/1974  United Kingdom ............... 285/197

*Primary Examiner*—Thomas F. Callaghan
*Attorney, Agent, or Firm*—Daniel Rubin

[57] ABSTRACT

A tapping sleeve for mounting on an in-service pipe under pressure in which a pipe opening is to be formed. The sleeve comprises upper and lower sleeve halves, one of which supports an endless gasket adapted to provide a pressure seal about the branch opening when formed in the pipe. Contained in the lower sleeve half are a plurality of arcuately displaced longitudinally extending metal pads mounted for articulation and adapted to support the pipe against internal pressure forces. The pipe engaging surfaces of the pads are inwardly curved approximating the pipe radius and are sufficiently deformable to enable surface conformance with the circumferential curvature of pipe wall in distributing the unit force loading therefor.

8 Claims, 2 Drawing Figures

TAPPING SLEEVE FOR LARGE SIZE PIPE

CROSS REFERENCE TO RELATED APPLICATIONS

Application Ser. No. 711,336 filled Aug. 4, 1976 for "Tapping Sleeve" in the name of Robert Paul Montesi and now abandoned.

BACKGROUND OF THE INVENTION

1. The art to which the invention pertains includes the art of saddle-type pipe couplings for tapping fluid handling piping under pressure.

2. Tapping sleeves are commerically available from a variety of manufacturing sources and are commonly used for adding a branch connection to an in-service pipeline on site. In a customary design of such sleeves as disclosed, for example, in U.S. Pat. Nos. 3,527,483 and 3,807,435, the sleeve is formed of two separate halves that are longitudinally clamped in an encircling relation on the pipe. The upper half contains a branch sleeve through which the pipe can be cut on site and which thereafter functions as a branch opening for supplying localized service of the line content in a well known manner.

Characteristic of such installations is that fluid pressure in the branch imposes a reverse thrust force on the opposite pipe wall resulting from branch line pressure. For like pressures contained in the branch line the magnitude of imposed thrust force varies with the square of the branch diameter. By way of comparison, therefore, a 16-inch diameter branch will impose substantially four times the thrust force on its pipe main as the like pressure contained in an 8-inch diameter branch. While the force has increased by a magnitude of four, the comparative increase in wall thickness is significantly less. That is, an 8-inch class 22 cast iron pipe has a wall thickness of 0.41 inches while the 16-inch pipe has a wall thickness of 0.54 inches amounting to about one-third increase. Because of this relationship the wall thickness of the larger sizes in relatively less able to withstand the branch imposed internal loading and for which it is frequently necessary to provide reinforced support from the sleeve.

At the same time as it may be necessary to provide such reinforcement, these pipes are subject to wide variation of outside diameter per nominal pipe size which because of the size variations has previously required a virtual custom matching of sleeve components to ensure the necessary support. Such wide variations per nominal pipe size can be anticipated, particularly those for underground service, not only by chance but also by code. As set forth, for example, by the American Water Works Association, 12-inch cast iron pipe calls for an outside pipe diameter on their official pipe designations A and B of 13.200 inches, while outside diameter on their C and D pipe designations are of 13.500 inches, each with a tolerance of plus of minus 0.060 inches. The limits of these extremes can produce a dimensional swing of 0.420 inches contributing to the above mentioned problem.

As a result of the foregoing, selection of sleeve loading support in the larger pipe sizes has been largely on a custom fit basis, e. g. one support combination for the A and B pipe designations and a second support for the C and D pipe designations. Such custom matching, of course, contributes to a higher cost to be incurred both by virtue of the duplicated inventory and the added labor associated therewith. Despite recognition of the problem, a single tapping sleeve support capable of accommodating the increased loading while concomitantly accommodating the wide variation in pipe sizes has not heretofore been known.

SUMMARY OF THE INVENTION

This invention relates to tapping sleeves and more specifically to such a sleeve for large size pipe on the order of ten-inch diameter and above singly able to accommodate the combination of both increased loading support and the wide dimensional variations to be encountered per nominal pipe size with a single standard construction. This is achieved in accordance herewith by utilizing an otherwise prior art two-part sleeve adapted to encircle the pipe. Mounted for articulated movmement in the lower half are two arcuately spaced longitudinally extending metal pads of predetermined support surface per nominal pipe size. The supporting surfce of each pad is inwardly curved to approximate the minimum pipe radius per nominal pipe size yet is sufficiently deformable on bolt up of the sleeve to conform with the circumferential curvature of the pipe in distributing the unit force support loading therefor. With the pads being supported for articulation, the variation of encountered pipe size can be readily adjusted to in the course of installation without the need for custom matchup in the manner of the prior art. Consequently, by means of this construction the previous problems associated with custom matching or the like have been substantially if not completely eliminated as to solve a long standing problem in a highly economical and efficient manner.

It is therefore an object of the invention to provide a novel construction for a tapping sleeve.

It is a further object of the invention to afford a novel tapping sleeve construction readily able to accommodate varying pipe dimensions per nominal pipe size in combination with the increased loading support required for larger size piping.

It is a still further object of the invention to effect the foregoing objects in a relatively inexpensive manner by means of articulating support members contained in the lower half of the sleeve.

Figure 1:
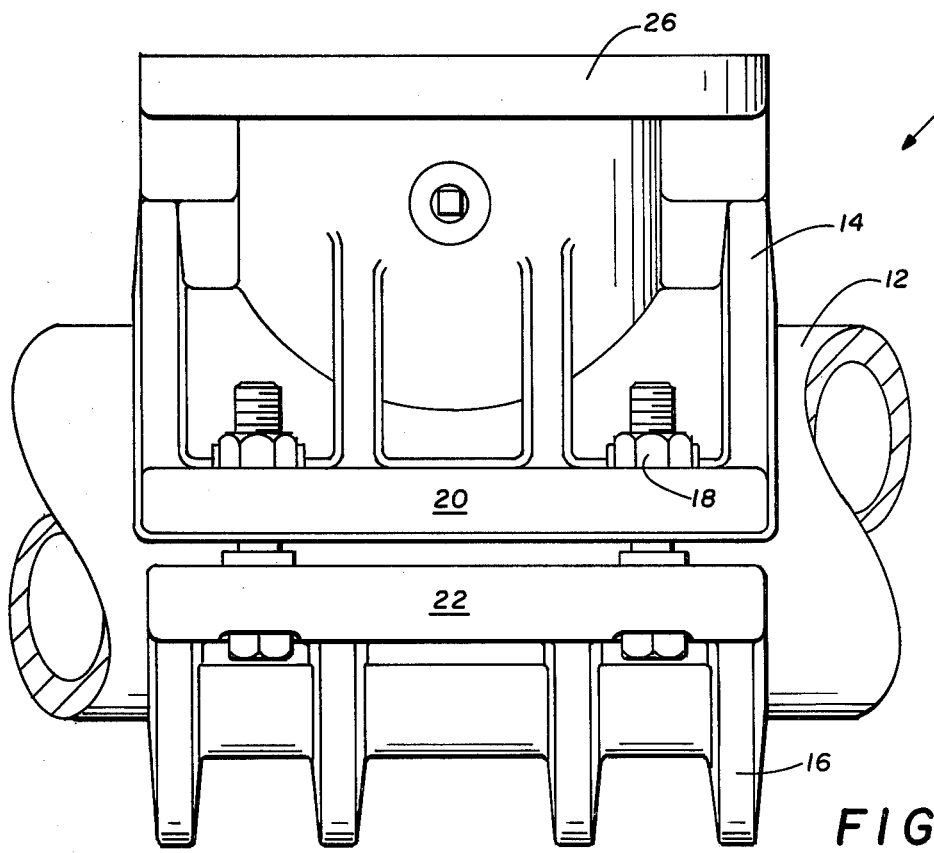
FIG. 1 is a longitudinal side elevation of a tapping sleeve in accordance herewith.
Figure 2:
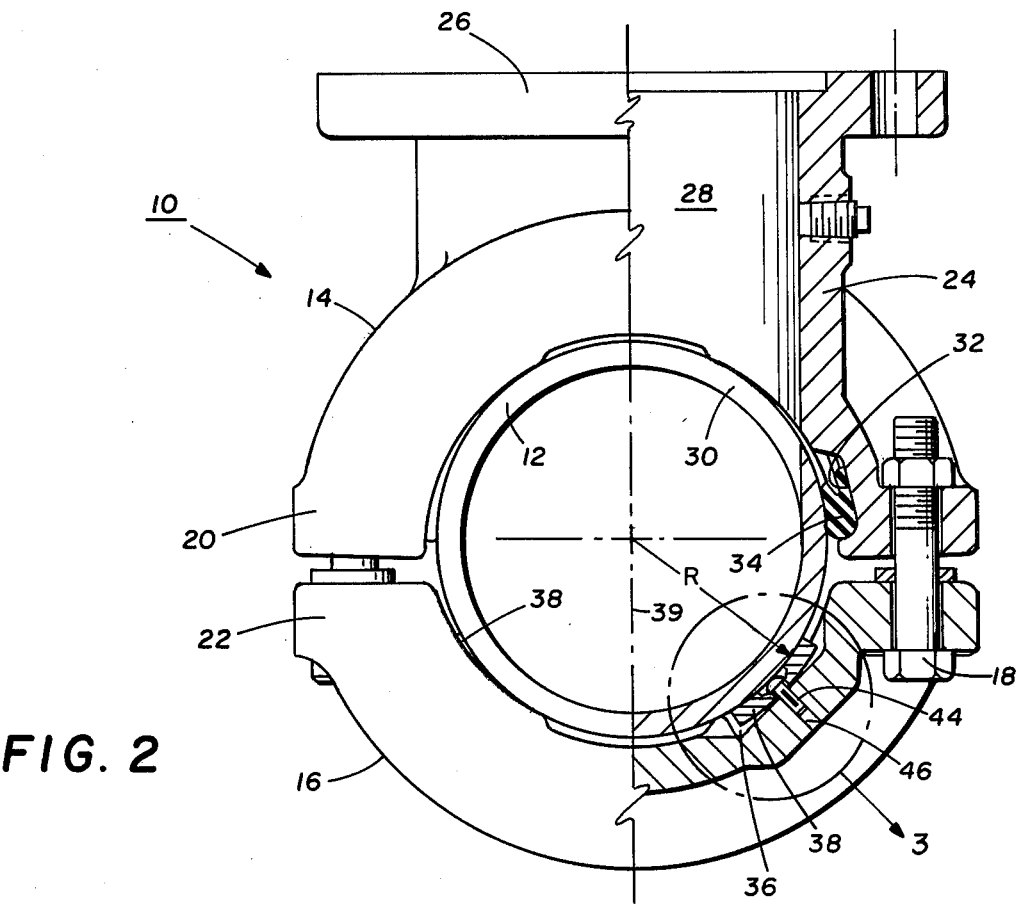
FIG. 2 is an end elevation partially sectioned of the sleeve of FIG. 1.
Figure 3:
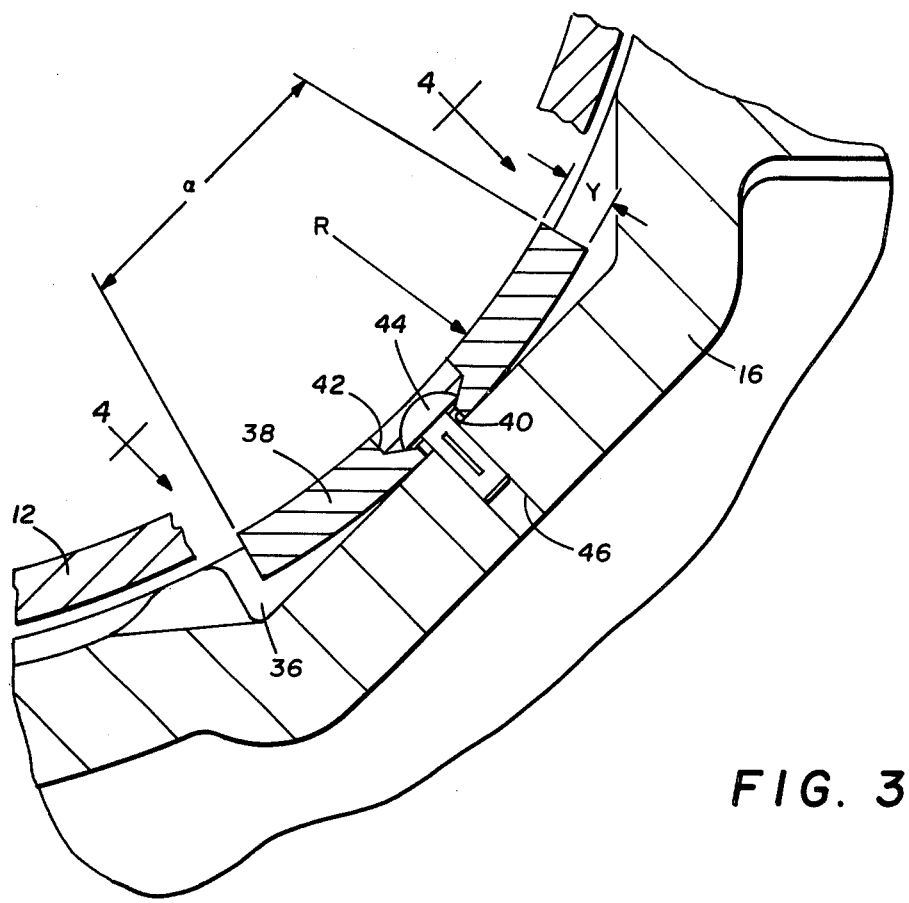
FIG. 3 is an enlarged fragmentary section of the encircled portion of FIG. 2.
Figure 4:
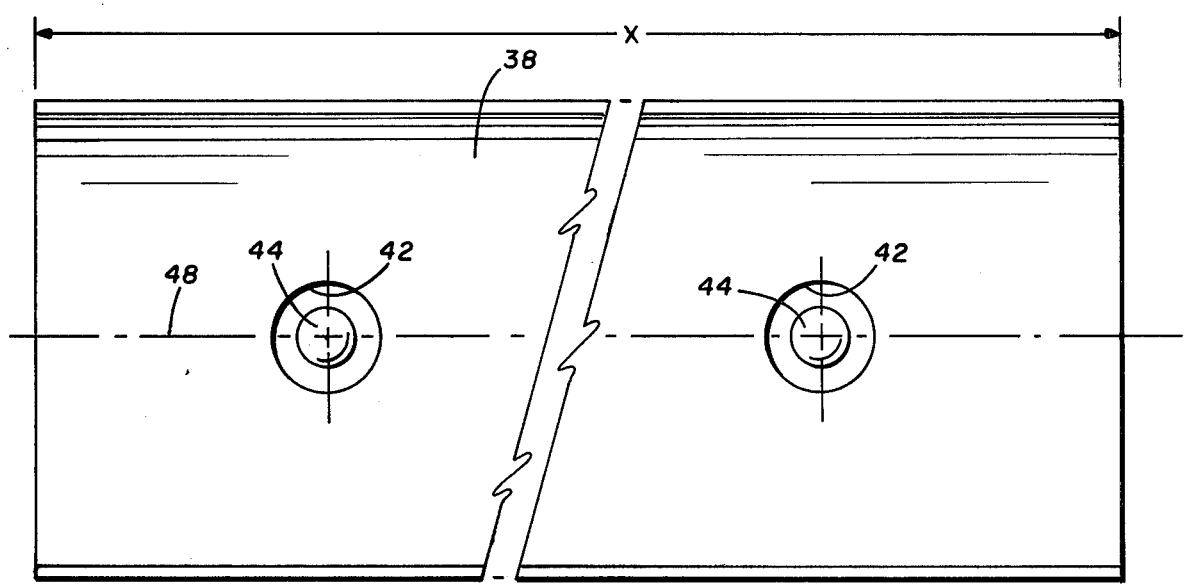
FIG. 4 is a longitudinal plan view of the support pads as seen substantially along the lines 4—4 of FIG. 3.

Referring now to the drawings, the tapping sleeve hereof is designated 10 and is shown positioned on a section of pipe 12 with which the sleeve is to be used. Comprising the sleeve is an upper half 14 and a lower half 16 each ribbed on its exterior for strength. Joining the halves for securing the sleeve in position are a plurality of nuts and bolts 18 extending through companion flanges 20 and 22. Formed in upper sleeve half 14 is an integral branch neck 24 extending in a direction lateral to the axis of pipe 12 and terminating in a flange 26 to which valving and branch piping can be connected. Defined by neck 24 is a flow passage 28 encircling an opening 30 cut through the wall of pipe 12 in a well known manner. A continuous circumferentially extending gasket recess 32 receives and contains a gasket 34 which may, for example, be of a type disclosed in the cross referenced application identified above for effecting a pressure-tight seal about opening 30.

For achieving the objectives of the invention as will now be described, there is formed on the inside face of lower sleeve half 16 two circumferentially spaced longitudinal recesses 36, each of which receives and contains a support pressure pad 38 in accordance herewith. Generally speaking, each pad is in radial alignment with the pipe center oppositely located and at least 30° offset from vertical axis 39. Each pad 38 is formed of a radius R approximating or equalling the minimum radius for the nominal pipe size with which it will be used and is of an arcuate extent α of on the order of about 30°. Length X of the pad corresponds generally to the axial width of sleeve half 16 and thickness Y is usually on the order of about ⅜ inches. These dimensions can, of course, be varied to suit. Composition of the pad is selected to afford essentially total curvature conformance and in a preferred embodiment is formed of a low carbon type steel characterized by sufficient ductility over its arcuate extent.

To positively attach or mount the pads in place each includes a pair of transverse thru bores 40 counterbored at 42 through which to receive a short drive stud 44 having raised surface ridges (not shown) parallel to its axis. Stud 44 extends force fit on its raised ridges into sleeve bore 46 radially formed in the wall of sleeve half 16 as to provide a secure fit for handling and shipping but insufficient to restrain pad 38 against intended articulation. Being supported in this manner, each pad 38 is essentially cradled against the backside of recess 36 enabling it to articulate about a longitudinal axis 48 extending between rivets 44.

In operation, mounting sleeve 10 onto a pipe section 12 places support pads 38 against the underside of pipe 12. As nuts and bolts 18 are finally torqued, the pads will incur slight deformation until assuming full surface contact conforming with the circumferential curvature of the pipe O. D. thereat. When so positioned, the pads will provide added support to the pipe wall resisting internal loading imposed by branch line pressures thereat. By virtue of its deformation properties, coupled with its articulated mounting, the pad surface is enabled to conform concentrically into surface engagement with the pipe O. D. in distributing the increased unit loading imposed against the pipe. With uniform pad engagement being assured, the pipe load can be safely supported beyond the ordinary contemplated safety factors therefor to assure the safety essential to such installations. Since load distribution can be relied on in this manner, a pair of pads 38 in sleeve 10 are all that is necessary to accommodate the contemplated variations per unit pipe size as to eliminate the need for a plurality of custom matching supports in the manner of the prior art.

By the above description there has been disclosed a novel tapping sleeve for large size pipe able to provide the underside support required for such pipes while at the same time accommodating wide variations per nominal pipe size without the need for matching supports in the manner of the prior art. Being supported for articulation in the manner hereof thereby enables achievement of the foregoing as to afford a substantial savings in the cost and manufacture of such sleeves.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A tapping sleeve adapted for mounting onto a pipe section of contemplated diametral variation per nominal pipe size in which a branch opening is to be formed comprising the combination of complementary sleeve halves adapted to be secured together in substantially encircling relation on the pipe section and a branch connection extending outward from one of said halves to define the location on the encircled pipe at which a branch opening is to be formed, the improvement comprising:

a. support means of substantially inelastic composition to provide added load support for the pipe wall against internally imposed line content forces; and b. joint means positively attaching said support means for articulated movement on the pipe engaging wall of the other of said sleeve halves.

2. In a tapping sleeve according to claim 1 in which said support means comprises pad means of surface area sufficient to effect a predetermined load distribution underlying the pipe wall and arcuately shaped initially approximating the circumferential surface curvature of pipe section with which it is to be utilized.

3. In a tapping sleeve according to claim 2 in which said pad means is attached by said joint means to said other sleeve half in a manner affording a freedom of articulated movement about a longitudinal axis extending generally parallel to the axis of the sleeve.

4. In a tapping sleeve according to claim 3 in which said pad means is deformable in response to the mounting forces of installation onto a pipe section for substantially conforming the surface contour of the pad means with the circumferential surface curvature of the pipe.

5. In a tapping sleeve according to claim 4 in which said pad means includes at least two separate parallel extending pad units located circumferentially displaced on the circumferential inside wall of said other sleeve half.

6. In a tapping sleeve according to claim 5 in which the circumferential inside wall of said other sleeve half includes longitudinal recesses defined therein for receiving said pad units.

7. In a tapping sleeve according to claim 5 in which said pad units are symetrically located with respect to a plane extending through the sleeve axis substantially normal to the face plane of the said other sleeve half mounting flanges.

8. In a tapping sleeve according to claim 7 in which said pad units are located at least sixty degrees apart.

* * * * *